United States Patent [19]

Chard et al.

[11] 4,098,096
[45] Jul. 4, 1978

[54] HIGH STRENGTH, NON-METALLIC COUPLING

[75] Inventors: Steven D. Chard; W. A. Loker, both of Leonardtown; John T. Meredith, Lexington Park, all of Md.

[73] Assignee: The United States of America as represented by the Secretary of the Navy, Washington, D.C.

[21] Appl. No.: 800,590

[22] Filed: May 25, 1977

[51] Int. Cl.² .................. F16D 3/64; F16D 3/18; F16D 3/14
[52] U.S. Cl. .................. 64/14; 64/9 R; 64/27 NM; 403/359
[58] Field of Search ............ 64/14, 9 R, 27 NM, 15; 74/451, 462, 438; 403/359

[56] References Cited

U.S. PATENT DOCUMENTS

| 2,015,430 | 9/1935 | Matthews | 64/15 |
| 2,615,315 | 10/1952 | Werner | 64/14 |
| 2,639,496 | 5/1953 | Hartzell | 64/14 |
| 2,737,033 | 3/1956 | Bendall | 64/14 |
| 2,893,224 | 7/1959 | Schmitter | 64/14 |
| 3,257,860 | 6/1964 | Runde | 64/27 NM |
| 3,321,935 | 5/1967 | Wildhaber | 64/14 |
| 3,916,716 | 11/1975 | Rix | 74/462 |
| 4,006,993 | 2/1977 | Woerlee | 403/359 |

FOREIGN PATENT DOCUMENTS 1,145,588  5/1957  France ................ 64/14

*Primary Examiner*—Benjamin W. Wyche
*Assistant Examiner*—R. C. Turner
*Attorney, Agent, or Firm*—R. Sciascia; R. Beers; S. Sheinbein

[57] ABSTRACT

A torque coupling comprising two non-metallic inserts linked together by a slip-fitted shaft having a multi-sided cross-section. One of the inserts is press-fitted into the internal involute shaft of a driving mechanism, such as a gear box, while the other is similarly fitted into the internal involute shaft of a driven mechanism, such as a pump. The multi-sided configuration of the slip fitted shaft permits the torque load to be distributed compressively on the inserts. Consequently, greater torque loads can be transmitted by the coupling with the benefit of the low-wear, self-lubricating characteristics of certain non-metallic insert materials.

6 Claims, 2 Drawing Figures

HIGH STRENGTH, NON-METALLIC COUPLING

BACKGROUND OF THE INVENTION

The present invention relates to power transmission and more particularly to torque couplings for use in the transmission of rotational power.

The technology of power transmission through shaft couplings has not advanced significantly in recent times. Common practice has been to use splines, keys, or equivalent to retain the mated parts in fixed angular relation to each other. With splines or keys, the perimeters of the shaft and of the bore of its mate change abruptly in outline with the result that stresses are concentrated at the regions of discontinuity. The couplings have tended to fail at these localized regions of high stress. Moreover, the configurations of conventional splines or keyways caused the components of the coupling to be subjected to high tensile stresses. Since contemporary low-wear, self-lubricating plastic material have relatively low tensile strengths, it has not been possible to utilize these materials as components in conventional couplings. Because many torque couplings are used in applications where excessive wear is experienced, the use of low-wear, self-lubricating components would be highly advantageous.

SUMMARY OF THE INVENTION

Accordingly, the instant coupling design represents an advancement over previous technology through mating thermoplastic material technology and wear resistant shaft design techniques. The coupling comprises two non-metallic inserts linked together by a slip-fitted shaft having a multi-sided cross sectional configuration. The inserts employ splines on their outside circumference to connect the coupling with, in one case, the internal involute shaft of a driving mechanism and, in the other, the internal involute shaft of a driven mechanism. The multi-sided shape of the slip-fitted shaft and the corresponding insert bores into which it slip fits couples the shaft to the inserts and distributes the torque load evenly on the inserts. The multi-sided configuration also serves to transpose the torque load effectively into compressive load in the non-metallic material of the inserts. Tensile stresses resulting from misalignment, binding, and shaft windup are off-set by compressive preload achieved by the press-fit of the non-metallic insert and the internal involute shaft.

OBJECTS OF THE INVENTION

It is therefore an object of the present invention to provide a torque coupling which will reduce the amount of wear experienced by the components of the coupling and the machinery to which they are connected.

It is also an object of the present invention to provide a torque coupling with self-lubricating components.

It is a further object of the present invention to provide a torque coupling constructed of expendable plastic parts easily replaced and capable of low cost direct forming.

It is yet another object of the present invention to provide a torsional coupling that will minimize drive coupling failures and result in less equipment down time.

It is still another object of the present invention to provide a torque coupling that can salvage excessively worn drive train components by the insertion of non-metallic inserts into the worn involute spline shafts and therefore return to service otherwise unuseable hardware.

BRIEF DESCRIPTION OF THE DRAWINGS

Other objects and many attendant advantages of the present invention will be readily apparent as the invention becomes better understood by reference to the following detailed description with the appended claims, when considered in conjunction with the accompanying drawings of one such coupling configuration wherein:

DESCRIPTION OF THE PREFERRED EMBODIMENT

Figure 1:
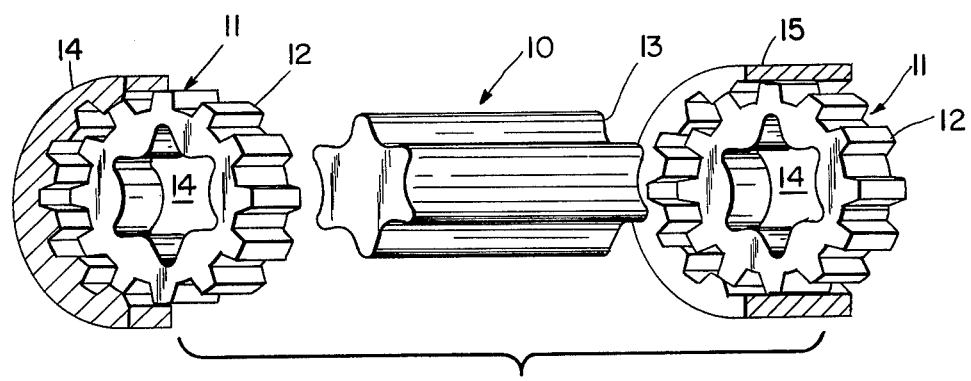
FIG. 1 is a perspective view of the torque coupling according to the invention which utilizes a star shaped configuration.

Referring now to the drawings, wherein like reference characters designate like or corresponding parts throughout the several views, FIG. 1 shows the basic components of the invention comprising a tempered steel shaft 10 and non-metallic inserts 11. Inserts 11 slip-fit on opposite ends of shaft 10 and the device so assembled represents the torque coupling of the present invention. Internal involute shafts 14, 15, provided at opposite ends of the torque coupling, are associated with a torque supplying mechanism and a torque receiving mechanism, respectively. To connect the coupling to, and maintain angular relation with the torque supplying mechanism, such as a gearbox, (not shown) applied to one end of the coupling, the torque receiving mechanism, such as a pump (not shown) applied to the other end of the coupling, inserts 11 employ splines 12 on their outside circumferences and are press-fitted into the internal involute shafts 14, 15 which mate with the splines. Press-fitting pre-stresses the insert 11 material so that non-compressive stresses are avoided in operation and tensile stresses resulting from misalingment, binding and shaft windup are off-set. Shaft 10 has a star shaped cross-section comprised of six identical flat-sided tooth-like splines 13 rounded at at the tip and root. The inserts 11 have similarly shaped bores 14 correspondingly formed to register with the splines 13 of shaft 10 in slip-fit relation and to so couple the inserts 11 to the shaft 10.

Figure 2:
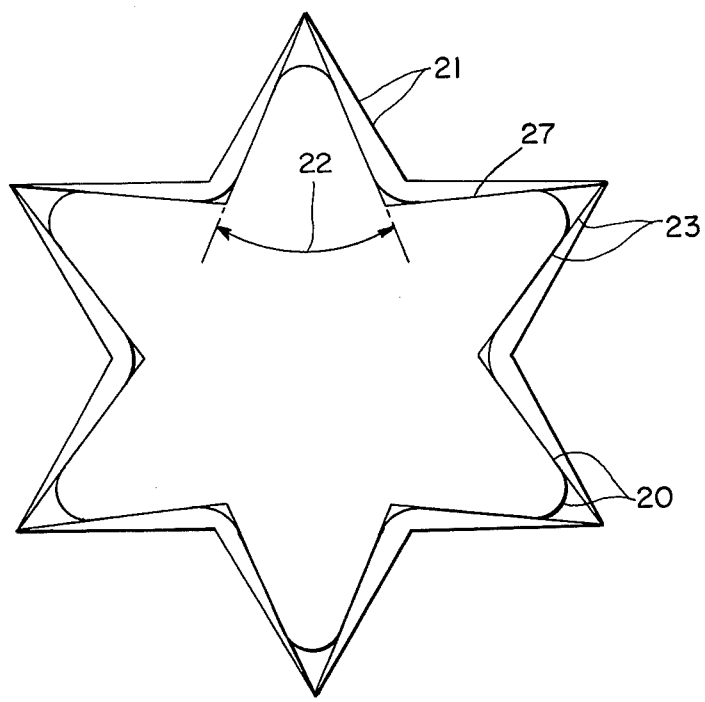
FIG. 2 is a cross-sectional view of the contour of the shaft and insert bores according to the invention which utilizes a star shaped configuration.

Referring now to FIG. 2 the star shaped configuration 20 of shaft 10 and the inner contour of inserts 11 may be formed by outlining a regular six-sided star 21 of a size such that the outer tips of the points of the star just fit inside a circle of diameter equal to the inside diameter of the involute shafts 14, 15 to which the coupling is to mate. While maintaining symmetry, the position of the lines forming the points of star 21 should be adjusted so that the included angles 22 formed at the tips of the points of the star are between 35° and 65°. The tips and roots of the points of the star 23 so formed should be generously rounded. The insert bores 14 are shaped so as to have a configuration identical to that of the shaft 10 but are slightly larger so that the shaft may slip-fit into the bores of inserts 11.

Therefore, there has been provided a torque coupling of improved design. The symmetric configuration 20 of shaft 10 and insert bores 14 along with the flat-sided contact area 27 of the splines 13 allows the torque load to be distributed evenly on the shaft 10 and on the inserts 11 so that concentrations of stress are avoided. Further, the shape of splines 13 is such that they are generously rounded at tip and root, and are constructed with included tip angles 22 of between 35° and 65° allowing the inserts to be loaded compressively. This compressive loading permits inserts 11 to withstand greater torque loads and allows them to be constructed of non-metallic polyimide material having low wear characteristics such as "Vespel SP-1" manufactured by I. E. du Pont de Nemours Inc. of Wilmington, Delaware.

The high strength, nonmetallic coupling is expected to find broad acceptance by aerospace, automotive and industrial designers since it virtually eliminates wear and failure of expensive rotating components, such as motors, generators, pumps, etc. by eliminating metal to metal contact. Wear is limited to an expendable plastic part which is easily replaced and capable of direct forming at low cost and wear rates of the plastic part are significantly lower than the present metallic couplings. Savings in manpower, material and time will result due to ease of parts replacement and reduced wear rates. Minimization of drive coupling failures will result in less equipment down-time and safer vehicle (aircraft, ship, ground vehicle) operations.

Obviously, other embodiments and modifications of the present invention will readily be apparent to those of ordinary skill in the art having the benefit of the teaching presented in the foregoing description and drawings. In particular, the number of teeth may be varied between 3 and 9 or more, the tip angles may be varied and the inserts may be made of various low wear materials besides polyimides. It is, therefore, to be understood that this invention is not to be limited to the embodiments presented and that modifications and other embodiments are intended to be included within the scope of the appended claims.

What is claimed and desired to be secured by letters Patent of the United States is:

1. A coupling for transmitting high torque rotational forces between internal involute shafts, comprising:
    at least two rigid non-metallic inserts press-fitted one each into said internal involute shafts, said inserts having bores of multi-sided configuration, said inserts having means on their outside circumference for coupling said inserts to said internal involute shafts;
    a metallic shaft of multi-sided configuration slip-fitted into said insert bores;
    said multi-sided configurations of said metallic shaft and insert bores comprising a plurality of tooth-like splines substantially flat along their sides, whereby said inserts are evenly, symmetrically, and compressively loaded.

2. The coupling of claim 1, wherein said inserts are constructed of low wear plastic material.

3. The coupling of claim 1, wherein said tooth-like splines are rounded at their tips and roots.

4. The coupling of claim 2, wherein said shaft is constructed of tempered high strength steel.

5. The coupling of claim 3, wherein the multi-sided configuration is star-shaped and comprised of six splines.

6. The coupling of claim 5 wherein the tip angles formed by the intersection of lines drawn parallel to adjacent flat sides of said splines are between 35° and 65° and wherein the sides of said shaft and said insert bores are evenly and symmetrically spaced.

* * * * *